United States Patent

Peterson et al.

[15] 3,696,210

[45] Oct. 3, 1972

[54] DATA TRANSFERRING SYSTEM UTILIZING A MONITOR CHANNEL AND LOGIC CIRCUITRY TO ASSURE SECURE DATA COMMUNICATION

[72] Inventors: James W. Peterson, Elmhurst; John A. Tempka, Glenview, both of Ill.

[73] Assignee: Motorola, Inc., Franklin Park, Ill.

[22] Filed: Aug. 6, 1970

[21] Appl. No.: 61,729

[52] U.S. Cl...................179/15 BF, 325/41, 325/322, 325/478

[51] Int. Cl...................................................H04j 3/00

[58] Field of Search...........179/15 BP, 15 AD, 2 DP, 15 BF, 179/15 AE, 15 BY, 1.5 R; 325/41, 325/42, 322, 323, 478

[56] References Cited

UNITED STATES PATENTS 3,259,695 7/1966 Murakami .............179/158 Y

*Primary Examiner*—Kathleen H. Claffy
*Assistant Examiner*—David L. Stewart
*Attorney*—Mueller and Aichele

[57] ABSTRACT

The transmitter-encoder of the data transferring system utilizes polybinary, correlative encoding to develop an information carrying signal, which includes a monitor signal having a known data code, and data from a plurality of sources. The encoding techniques facilitates redundant bit transmission in a constrained bandwidth. The receiver-decoder includes monitor channel logic circuitry which determines whether the decoded signal is free from error. Moreover, each of the data decoding channels utilizes majority logic to verify that a particular control initiating signal is being received before the control signal is applied to data utilization devices associated therewith. If one error is detected in the monitor signal, the data channels are squelched for a first predetermined period of time thus preventing erroneous control signals from being applied to the utilization devices. If more than one error is detected in the monitor signal within a second predetermined period of time the data channels are squelched for a third predetermined period of time and an alarm is activated by the monitor channel-logic circuitry. As a result, the system provides security against abnormal transmission characteristics.

22 Claims, 10 Drawing Figures

PATENTED OCT 3 1972 3,696,210

SHEET 1 OF 6

Inventors
JAMES W. PETERSON
JOHN A. TEMPKA

BY Mueller & Aichele

Attys.

DATA TRANSFERRING SYSTEM UTILIZING A MONITOR CHANNEL AND LOGIC CIRCUITRY TO ASSURE SECURE DATA COMMUNICATION

CROSS REFERENCE TO RELATED APPLICATION

The subject matter of the present application is related to the subject matter of the application by the same inventors entitled, "Data Transferring System Utilizing Frame and Bit Timing Recovery Technique," Ser. No. 61,730, filed Aug. 6, 1970, and which is assigned to the same assignee as the present application.

BACKGROUND OF THE INVENTION

Data transferring systems are often required which can communicate data from a data source to a data utilization device located many miles apart and which can discriminate against errors in the data. Such data transferring systems are required by electric utility companies, for example, to exchange digital information between protective relays relating to electrical quantities being measured at selected points along power transmission lines. This digital information is utilized to trip enormous circuit breakers controlled by the protective relays to thereby disconnect a particular transmission line having a fault thereon from a power distribution system thus protecting the line, equipment and lives associated therewith. Since it is important that such a power line not be inadvertently connected or disconnected, it is essential that the digital data transferring system used therewith have a high degree of operational reliability, security against false outputs, and speed of information exchange. Moreover, it is desirable that the data transferring system provide essentially simultaneous communication between a plurality of protective relays.

In the past frequency shift keying (FSK) in combination with frequency division multiplexing (FDM) techniques have typically been utilized to transfer digital information between a plurality of protective relays, usually via base band or voice band channels. Although these systems generally provide satisfactory information transfer, some types thereof are susceptible to errors, resulting from frequency shift, caused by either the transmission medium or by the equipment, equal to the mark-space difference frequency. To guard against this possibility, prior art FSK/FDM equipment includes narrow bandwidth filters which discriminate against unwanted signals, and the mark-space frequency difference may be increased as compared to the difference normally employed. Moreover, additional frequency channels have also been used.

These techniques, however, are disadvantageous in some applications. For instance, since the narrow bandwidth filters delay signals passing therethrough, the amount of time necessary to transfer a given bit of information from the input to the output of the FSK receiver is increased, thus increasing the time between when a faulty line is detected and when the line is disconnected from the system. Moreover, the increase in mark-space frequency difference increases the bandwidth requirement. In some applications, bandwidth constraints are imposed by crowded microwave channels or by the desire to send the data over a commonly available "voice band" transmission cable, which has a relatively narrow bandpass. In these applications, FSK/FDM techniques may not provide an adequate data transmission rate, particularly when majority logic security operations are employed and a plurality of protective relays are being simultaneously monitored.

SUMMARY OF THE INVENTION

An object of the invention is to provide a binary data transmission system which facilitates secure information transfer at high speeds in a constrained bandwidth.

Another object of the invention is to provide a digital transmission system suitable for relaying control information between a plurality of protective relays.

The data transferring system includes a transmitter-encoder and a receiver-decoder. The transmitter-encoder includes a combiner which sequentially samples the output of a monitor data source, which generates a digital monitor signal of a known code, and the outputs of other data sources to thereby provide a serial bit stream. The transmitter also includes an encoder which transforms the serial bit stream into a ternary waveform, which after being filtered has a frequency spectrum suitable for being translated into the passband of and sent over a voice band transmission line or over base band microwave equipment to the receiver-decoder.

The receiver-decoder includes a slicer or full wave rectifier for converting the ternary waveform back into the serial bit stream, a bit separator for both applying the monitor signal to monitor channel logic circuitry and the digital information signals to data channel logic circuitry which operates utilization devices. Timing recovery circuitry is included which assures that the data bits are recovered without ambiguity. If the monitor channel logic circuitry detects an error in the monitor signal, it provides a squelch signal of a first predetermined time duration to the logic circuitry for the data channels thus preventing possibly erroneous control signal from being applied to the utilization devices. Furthermore, if more than one error signal is detected in a second predetermined time, the monitor channel logic circuitry applies another squelch signal of a third predetermined time duration to the logic circuitry for the data channels. To provide additional security, the logic circuitry for the data channels also include majority logic circuitry for verifying that a control initiating signal is received a predetermined number of times before the control signal is applied to the utilization devices.

DESCRIPTION OF THE PREFERRED EMBODIMENT

Figures 1, 2:
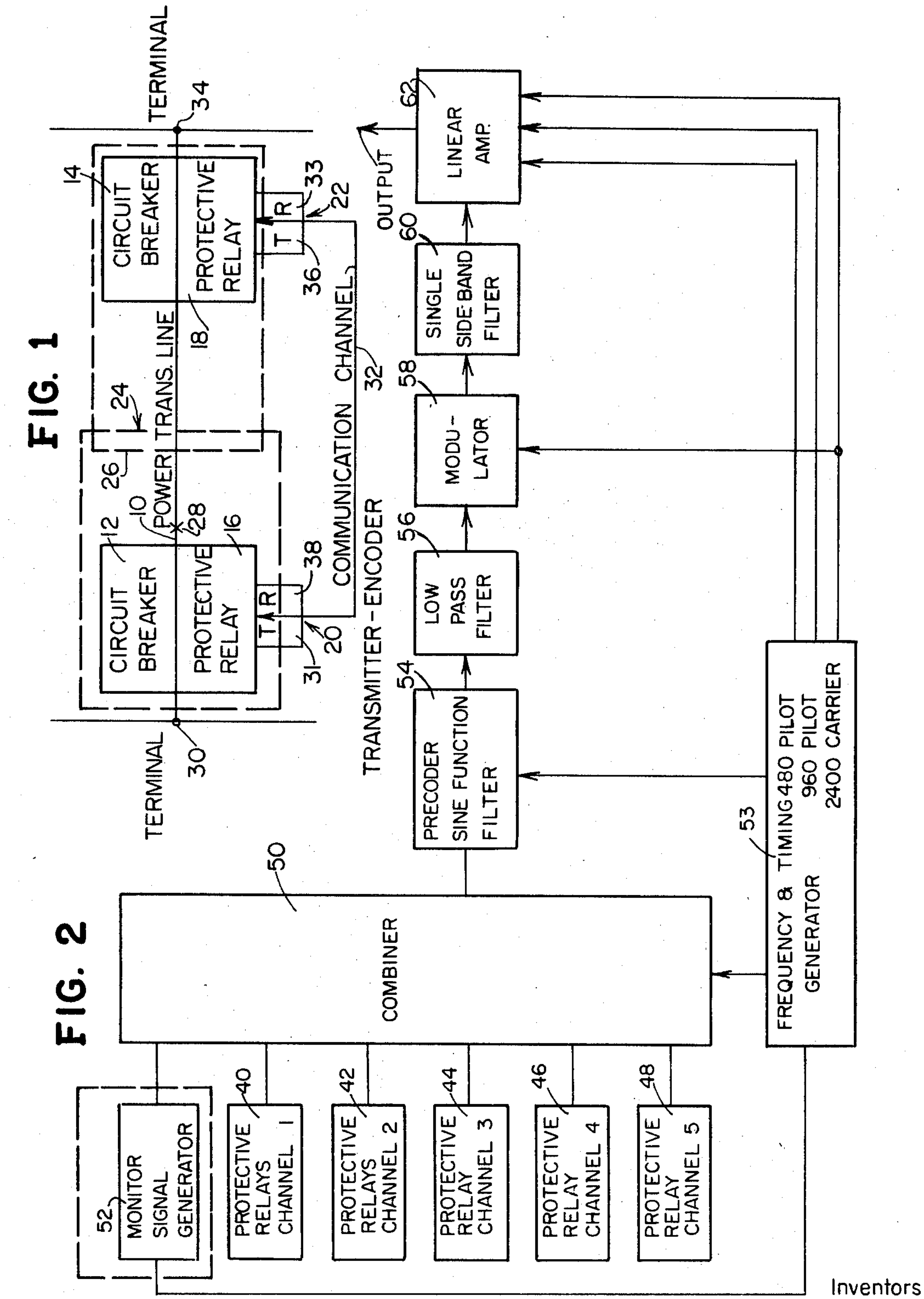
FIG. 1 is a block diagram illustrating a power transmission line, circuit breakers, protective relays, and a data transferring system.
FIG. 2 is a block diagram of a transmitter-encoder of one embodiment of the invention.

To facilitate an understanding of the requirements of a system of one embodiment of the invention the environment of one possible application thereof will first be described. Referring to FIG. 1, electrical utility companies utilize power transmission lines, represented by line 10, for transferring electrical power at up to 750,000 volts over distances of many miles. To protect line 10, and the equipment and lives associated therewith, enormous circuit breakers, for instance 12 and 14, are located at strategic points in the power distribution system. These circuit breakers (12 and 14) are respectively controlled by fault-sensing, protective relays 16 and 18 which continuously monitor electrical quantities associated with the lines to determine whether the power system is performing properly and if not, to determine where the trouble is located. If a fault occurs on line 10, information is relayed or transferred through interfacing communication equipment 20 and 22, coupled with respective relays 16 and 18, to appropriate circuit breakers which open to isolate the rest of a power system from line 10, and to remove power going to line 10.

Different monitoring schemes have been developed to protect electrical power transmission systems. FIG. 1 discloses the basic elements of a commonly used direct transfer trip (DTT) protective relaying system. In the DTT relaying scheme, relay 16 may be set to monitor transmission line 10 toward but underreaching relay 18 as indicated by dashed lines 24. The normal output level of the protective relay is a "0" or low state but if a fault is detected the protective relay provides an increased DC level or "1" trip signal at its output. Similarly, relay 18 may be set to monitor transmission line 10 toward but underreaching relay 16 as indicated by dashed lines 26. If a fault occurs, for instance, within the zone being monitored by relay 16 at point 28, relay 16 will trip local circuit breaker 12 near terminal 30, and transmitter 31 will send a continuous control of "change of state" signal which signifies the existence of the trip signal at the output of relay 16 over relaying channel 32 through receiver 33 to relay 18 located near terminal 34 which will open breaker 14. Hence, in the event of an overload on line 10, either protective relay 16 or 18 may detect the fault and transmit a control signal to the other relay thereby opening circuit breakers 12 and 14. In the DTT scheme the transmission and processing of the change of state signal should occur within the shortest time from when a fault is detected.

Alternatively, a phase comparison (PC) scheme is sometimes utilized wherein the line currents at the end of transmission line 10 adjacent terminal 34, for instance, are converted into a single phase signal which alternates between either of two DC levels. The phase of this signal is transmitted over relaying channel 32 to relay 16 for comparison with the phase of the local signal at relay 16 to determine whether there is a fault on the line. Hence, in either of the foregoing schemes a data transferring system 20 and 22 is required which can transfer a digital or two level control signal from relay 16 to relay 18 or from relay 18 to relay 16, or both, through relaying or communication channel 32 which may be either a transmission line or a microwave link. It is important that the data transferring system include security for discriminating against false control signals and that the signal processing time be minimum for the available bandwidth.

FIG. 2 is a block diagram of a transmitter-encoder which derives data from a plurality of protective relays 40, 42, 44, 46 and 48 which are similar to relays 16 and 18 of FIG. 1 but which respectively utilize channel 1, channel 2, channel 3, channel 4 and channel 5 of the data transferring system which are similar to channel 32. Monitor signal generator 52, which utilizes channel 0, and combiner 50 are both controlled by frequency and timing generator 53. Monitor signal generator 52 develops a pulse train of known format or of known pulse code which, after it has been demodulated at the receiver, is used to determine whether the data transferring system is operating error free. Combiner 50 sequentially samples the parallel outputs of monitor signal generator 52 and protective relays 40, 42, 44, 46 and 48 to develop a serial binary data stream at its output.

Precoder and sine function filter 54 is connected to the output of combiner 50 and converts the binary bit stream into a three level or ternary waveform having a predetermined frequency spectrum and no average DC component. Low pass filter 56, which is connected to the output of precoder and sine function filter 54, removes the high frequency components above a predetermined frequency from the ternary wave thereby reducing the width of its frequency spectrum. Modulator 58, which is connected both to the output of low pass filter 56 and to the carrier frequency (2,400 Hz) output of frequency and timing generator 53, amplitude modulates the carrier signal with the output of filter 56.

The output of modulator 58 is connected to single sideband filter 60 which selects the lower sideband of the amplitude modulated signal and applies it to linear amplifier 62. Frequency and timing generator 53 supplies the carrier and first (480 Hz) and second (960 Hz) pilot frequencies to linear amplifier 62. The combined output signal of linear amplifier 62, which includes the carrier, pilots and correlatively encoded data, is communicated to a receiver-decoder. The particular operation and sampling frequencies of the information transferring system have been selected to be compatible with either the transfer trip or the phase comparison protective relaying schemes. The above combined output signal can be transmitted either over channels such as a "voice band" transmission cable, having a bandwidth of from 300–3,000 Hz, or over multiplex and/or microwave equipment.

Figure 3:
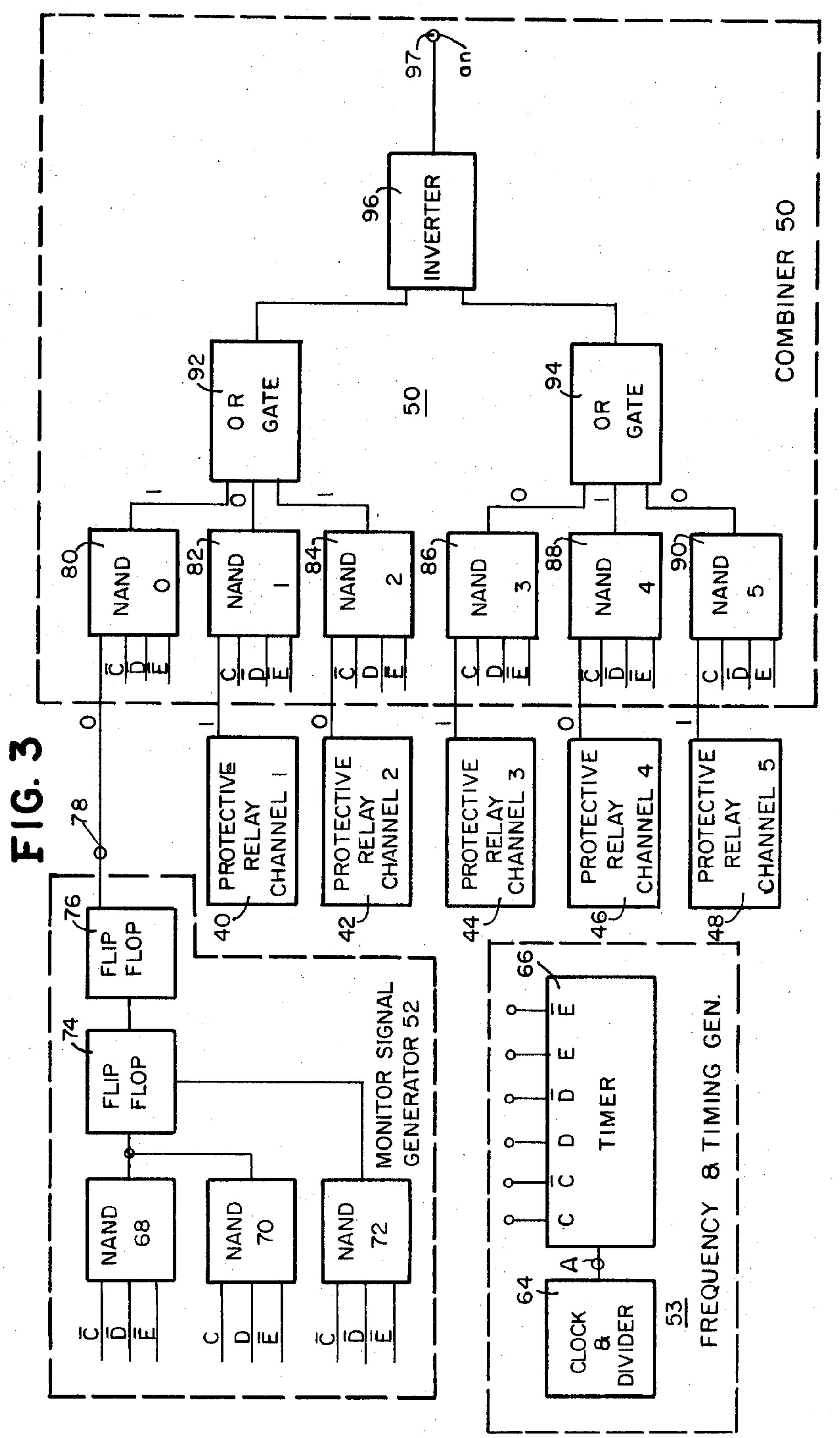
FIG. 3 illustrates the block diagram of a combiner and a monitor signal generator included in the transmitter-encoder of FIG. 2.
Figure 4:
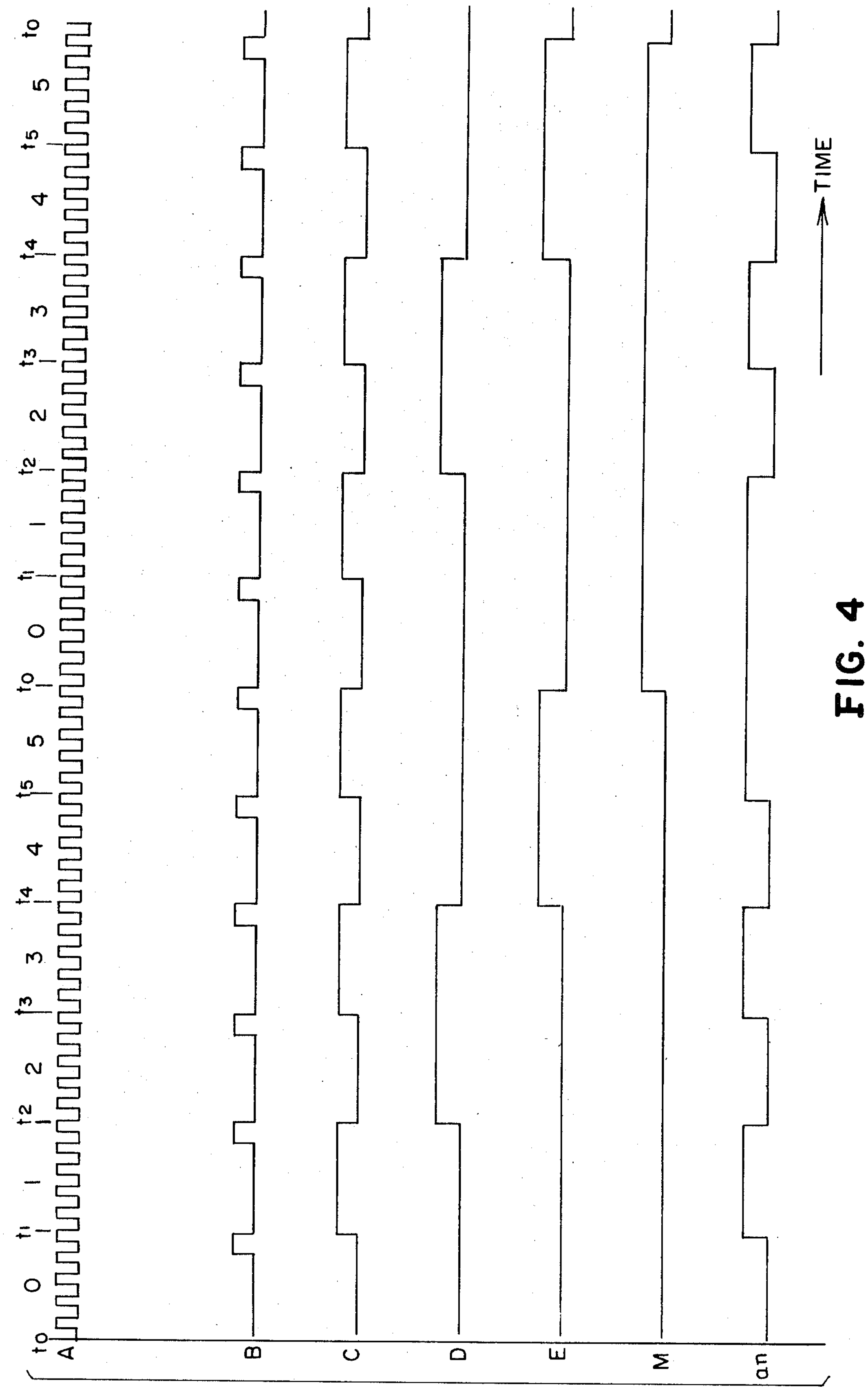
FIG. 4 is a timing diagram for illustrating the operation of the combiner and generator of FIG. 3.

Referring to FIGS. 3 and 4, the operation of monitor signal generator 52 and combiner 50 will be explained in somewhat more detail. Frequency and timing generator 53 includes clock oscillator and divider 64 and timer 66. The clock oscillator, for example, might be a crystal controlled square wave generator operating at a frequency in the megahertz region. The output of clock 64 may be divided down several hundred times by known digital techniques utilizing flip-flops to produce timing pulse train A of FIG. 4 which has a repetition rate of 14,400 pulses per second (pps). Pulse train B having a repetition rate of 2,880 pps is derived by dividing A by five through the utilization of known techniques. Pulse trains C, D, and E are likewise developed in a known manner from A in timer 66.

To generate the monitor signal of known pulse code, the C, D, $\bar{C}$, $\bar{D}$ and $\bar{E}$ outputs of timer 66 are connected to the inputs of NAND gates 68, 70 and 72 included in monitor signal generator 52. The "bar" symbol indicates that the voltage level for the particular pulse train is the inverse of that indicated by the "nonbar" symbol. The output of NAND gates 68 and 70 are both connected to the trigger input of flip-flop 74. The output of NAND gate 72 is connected to the set input of flip-flop 74. The output of flip-flop 74 is applied to the input of flip-flop 76.

NAND gate 68 is connected to provide a "0" or low level output only during the time that $\bar{C}$, $\bar{D}$ and $\bar{E}$ are applied thereto. Thus NAND gate 68 supplies a "0" output only when B, C and D are at their low level or "0" states which is the case during the 0 time interval between $t_0$ and $t_1$, as shown in FIG. 4. NAND gate 70 is connected to supply a "0" at its output when C, D and $\bar{E}$ is applied thereto. Thus as may be determined from FIG. 4, a square wave having a repetition rate of 960 pps is applied to the trigger input of flip-flop 74. NAND gate 72 applies a "0" or low level to the set input of flip-flop 74 only when $\bar{C}$, $\bar{D}$ and $\bar{E}$ occur. Hence, the output of flip-flop 74 is a square wave having a repetition rate of 480 pps. Flip-flop 76 divides the repetition rate of the square wave at the output of flip-flop 74 in half to provide a monitor signal or square wave M of FIG. 4 which has a rate of 240 pps. Pulse train M is the monitor signal of a known pulse code.

Combiner NAND gate 80 is arranged to provide a "1" or high level output at all times except when a "1" occurs at output 78 of flip-flop 76 in coincidence with $\bar{C}$, $\bar{D}$ and $\bar{E}$. As previously mentioned, $\bar{C}$, $\bar{D}$ and $\bar{E}$ occur during the time interval M which is subsequent to $t_o$ but prior to $t_1$. Therefore, the output of monitor signal generator 52 is sampled during the time bounded by $t_0$ to $t_1$.

Combiner NAND gate 82 is arranged to monitor the output state of protective relay 40 when C, $\bar{D}$ and $\bar{E}$ occur. It can be seen from FIG. 4 that this condition is met during the time slot bounded by $t_1$ and $t_2$. Consequently NAND gate 82 will provide a "0" if the output of protective relay 40 is a "1" during the time slot between $t_1$ and $t_2$. Similarly, combiner NAND gate 84 monitors the output of protective relay 42 during the time slot bounded by $t_2$ and $t_3$ when $\bar{C}$, D and $\bar{E}$ are present; combiner NAND gate 86 monitors the output of protective relay 44 during the time slot bounded by $t_3$ and $t_4$ when C, D and $\bar{E}$ are present; combiner NAND gate 88 monitors the output of protective relay 46 during the time slot bonded by $t_4$ and $t_5$ when $\bar{C}$, $\bar{D}$ and E are present; and combiner NAND gate 90 monitors the output of protective relay 48 during the time slot bounded by $t_5$ and $t_0$ of the subsequent frame, when C, $\bar{D}$ and E are present. Thus, combiner 50 sequentially samples the output states of monitor signal generator 52 and protective relays or data sources 40 through 48.

Assuming that the signal state at output 78 of monitor generator 52 is a "0;" that trip states or "1's" exist in relays 40, 44 and 48; and that trip states do not exist in relays 42 and 46, the outputs of NAND gates 80, 82, 84, 86, 88 and 90 will be as shown in FIG. 3. It is pointed out that the foregoing assumed "trip states" normally would not exist but they are assumed in order to facilitate the illustration of operation. The outputs of the NAND gates of FIG. 3 are inverted with respect to the actual states of the data sources being monitored. These output signals sequentially pass through OR gate 92, which is connected to the outputs of NAND gates 80, 82 and 84 or through OR gate 94, which is connected to the outputs of NAND gates 86, 88 and 90. Inverter 96, the inputs of which are connected to the outputs of OR gates 92 and 94, inverts the sequential outputs of the NAND gates to form a serial data stream $a_n$ at terminal 97, which reflects the actual output states of the monitor generator and the relays. The resulting pulse code for the assumed output states is shown by the $a_n$ train in FIG. 4. It is apparent from the above description and FIG. 4 that each time monitor signal M is sampled, its output state will have changed with respect to what it was the previous time it was sampled.

The rate at which each of the five protective relays and the monitor channels is sampled is defined as the bit rate, and the rate at which they are all sampled is defined as the frame rate. As can be seen from FIG. 4, the bit rate is controlled by waveform B which has a repetition rate of 2,880 pps and the frame rate is equal to that of waveform E, which has a repetition rate of 480 pps.

Figure 5:
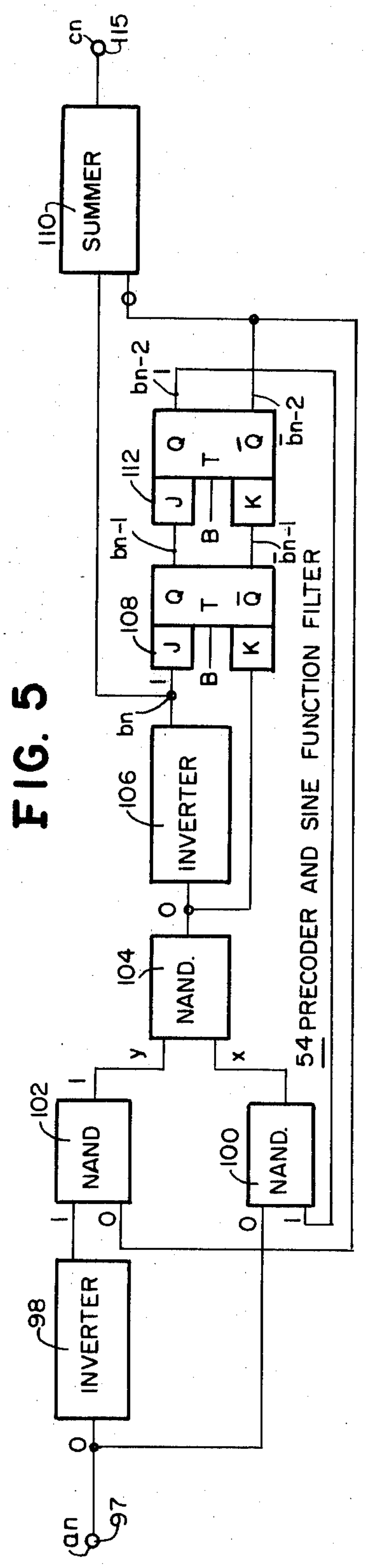
FIG. 5 is a block diagram of the precoder and sine function filter of the transmitter-encoder shown in FIG. 2.

FIG. 5 is a block diagram of precoder and sine function filter 54. Output terminal 97 of combiner 50 is connected to the inputs of inverter 98 and NAND gate 100. One of the inputs of NAND gate 102 is connected to the output of inverter 98. The inputs of NAND gate 104 are connected to the outputs of NAND gates 100 and 102. The input of inverter 106 and the "K" input of J-K flip-flop 108 are both connected to the output of NAND gate 104. The "J" input of J-K flip-flop 108 is connected to the output of inverter 106 and to the input of summer circuit 110. The Q and $\bar{Q}$ outputs of J-K flip-flop 108 are respectively connected to the "J" and "K" inputs of flip-flop 112. The $\bar{Q}$ output J-K flip-flop 112 is connected both to another input of NAND gate 102 and to the input of summer circuit 110, and the Q output is connected to another input of NAND gate 100. The T or trigger inputs of J-K flip-flops 108 and 112 are connected to frequency and timing generator 53 so that signal B of FIG. 4 is applied to the trigger inputs.

Figure 7:
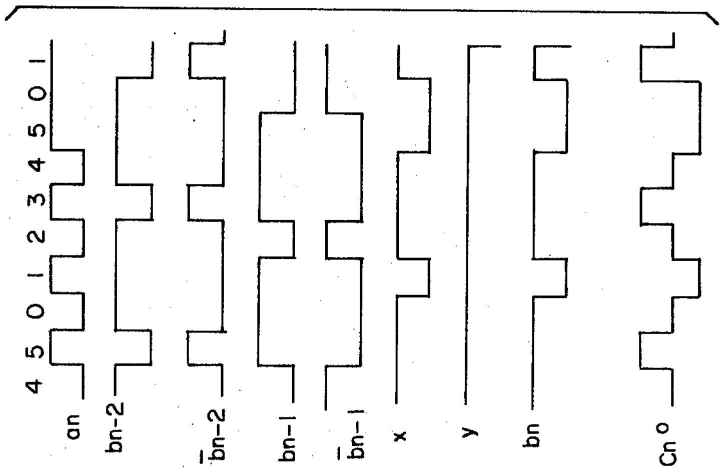
FIG. 7 illustrates the waveforms of the pulse codes indicated in truth table in FIG. 6.

Precoder and sine function filter of FIG. 5 perform correlative polybinary encoding on the serial bit stream $a_n$ of FIG. 4, which is also shown in FIG. 7, to form a ternary signal $c_n$, also shown in FIG. 7. Correlative polybinary encoding implies that the signal to be encoded is multilevel at the sampling instant of the precoder 54 and that a particular sampled value depends upon two or more values of the original modulating or $a_n$ sequence. Some discussions involving these techniques have appeared in the literature.

To develop the precoded and sine function filtered output signal ($c_n$) precoder 54 develops an intermediate signal ($b_n$) at the output of inverter 106 from the binary information sequence $a_n$ by performing modulo-two addition (⊕) of the binary sequence and the intermediate signal delayed by two data bit intervals ($b_n$—2) which occurs at the Q output of J-K flip-flop 112. The mathematical expression for this operation is as follows:

$$b_n = a_n \oplus b_n - 2 \quad (1)$$

The precoded and sine function filtered output signal $c_n$ is derived by adding in summer circuit 110 the intermediate signal ($\bar{b}_n$) and the inverse of the intermediate signal delayed by two data bit intervals ($\bar{b}_n$—2) which occurs at the $\bar{Q}$ output of J-K flip-flop 112. The mathematical expression for this operation is as follows:

$$c_n = b_n - b_n - 2 \quad (2)$$

Figure 6:
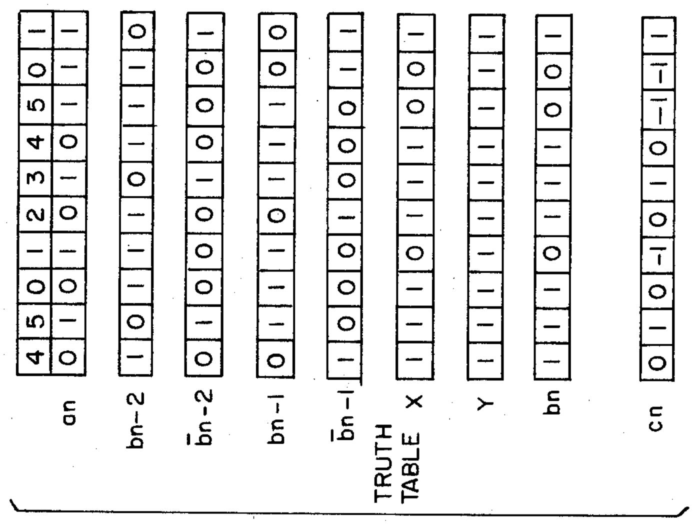
FIG. 6 is a truth table illustrating the operation of the precoder and sine function filter shown in FIG. 5.

The logic circuitry shown in FIG. 5 performs the operations expressed by relationships (1) and (2.) To explain the operation of FIG. 5, the initial signal states are assumed as shown in the left hand or first column (4) of the truth table of FIG. 6. Hence, since the $a_n$ input to inverter 98 is a "0," its output is a "1." This "1" along with the "0" from the $\bar{b}_n$—2 or $\bar{Q}$ output of J-K flip-flop 112 are applied to NAND gate 102 to form the "Y" output which is a 1. Furthermore, since the $a_n$ input to NAND gate 100 is also a "0" and the $b_n$—2 input, from the Q output of J-K flip-flop 112 is a "1," the "X" output of NAND gate 100 is a "1." Since both the X and Y inputs to NAND gate 104 are "1's" its output is a "0." The output of NAND gate 104, in this case a "0," passes to the K input of J-K flip-flop 108 and it passes through inverter 106 to form the $b_n$ signal, which is a "1." J-K flip-flop 108 holds a $b_n$ signal delayed by one data bit or $b_n$—1 signal which is assumed to be a "0" and the $\bar{b}_n$—1 which is therefore a "1." J-K flip-flop 112 holds a $b_n$—1 delayed by one data bit or $b_n$—2, which is a "1," and a previous $\bar{b}_n$—1 or $\bar{b}_n$—2 which is a "0." The $b_n$ signal from the output of inverter 106 and the $\bar{b}_n$—2 signal from the Q output of J-K flip-flop 112 are applied to the input of summer circuit 110 which adds the two together to form the ternary precoded output signal $c_n$. FIG. 7 depicts waveforms corresponding to the digital codes set out in the truth table of FIG. 6. The relationships between the $c_n$, the $b_n$ and the $\bar{b}_n$—2 signals are shown in FIG. 7.

Since over a relatively long sample, the $c_n$ signal train has many positive-going portions as negative-going portions, its average component is zero. Thus it is seen that the $c_n$ signal is a three level waveform, hence, polybinary. Furthermore, since each particular sampled value of $c_n$ depends on two or more values of the original $a_n$ modulating sequence, the modulating technique is described as "correlative polybinary" encoding. If the negative-going portions of the $c_n$ signal shown in FIG. 7 are converted into positive-going portions, the $a_n$ signal of FIG. 7 is derived. Hence, the $a_n$ signal can be reconstructed by slicing the $c_n$ signal at the receiver.

Figure 8:
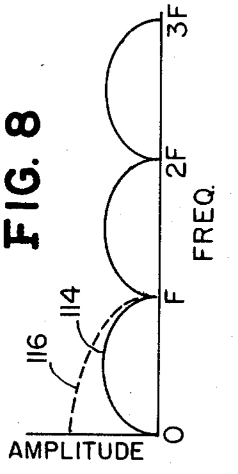
FIG. 8 shows the spectral characteristics of the sine function filter of FIG. 5 and of the low pass filter of FIG. 2.

FIG. 8 includes a graph 114 which illustrates the amplitude vs. frequency characteristic of the $c_n$ signal at output 115 of precoder and sine function filter 54. This amplitude characteristic has a periodicity of $F$ Hertz where $F$ is inversely proportional to the duration of each bit ($F = ½T$ where $T$ is the duration of the bit). For the data rate of 2,880 pps, $F$ is equal to 1,440 pps. As previously mentioned in reference to FIG. 1, the $c_n$ output of the precoder and sine function filter 54 is coupled to low pass filter 56. Since low pass filter 56 has a selected upper cutoff characteristic 116, as shown in FIG. 8, it eliminates the redundant information existing at frequencies above the "$F$" frequency. As previously mentioned, single sideband (SSB) modulating and filtering techniques are utilized to shift the selected frequency spectrum (0–1,440 Hz) of the filtered $c_n$ signal into a range (960–2,400 Hz) thereby developing a data frequency band which is compatible with the useful passband of a voice band transmission cable or with base band microwave. The $c_n$ spectrum can be translated to any desired frequency to suit the particular communications medium.

A particular advantage of the above described correlative polybinary encoding technique is that the Nyquist data transferring rate of 2 symbols per second per hertz of bandwidth is achievable with corresponding reduction in signal-to-noise. Moreover, unlike straight binary techniques which have a zero tolerance to any increase in data rate above the Nyquist rate, this correlative technique is nearly insensitive to moderate increases in transmission speed above the Nyquist rate. Moreover, SSB is particularly attractive since the average component of the $c_n$ signal is suppressed. The use of a SSB modulated signal is advantageous because its modulation product (960–2,400 Hz) requires the same bandwidth as the modulating signal (0–1,440 Hz). Thus when combined with SSB modulation, this correlative encoding permits a resulting speed advantage over prior art binary FSK of approximately 4:1.

Figure 9:
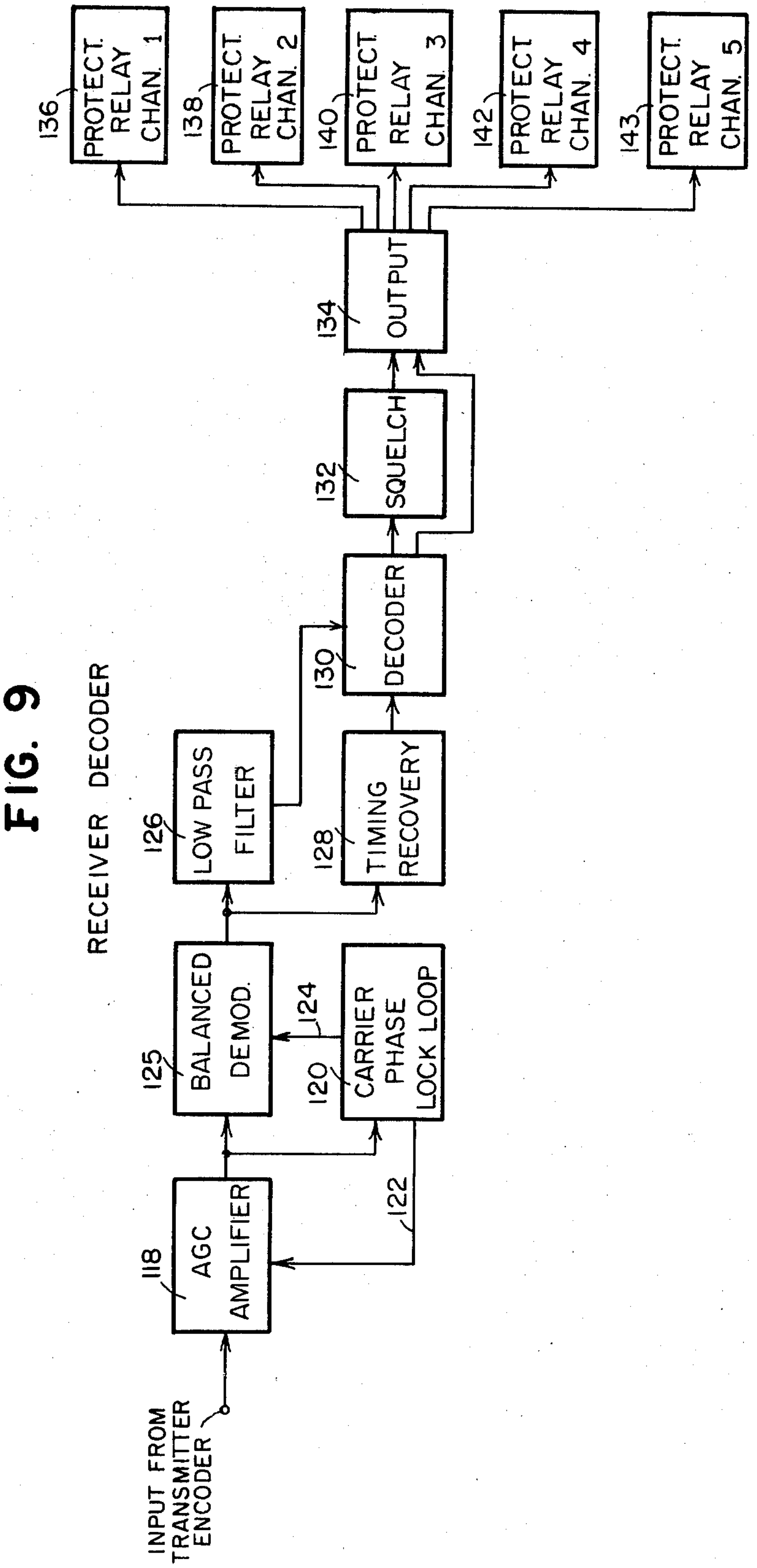
FIG. 9 is a block diagram of the receiver-decoder of the invention.

FIG. 9 is a block diagram of the receiver-decoder of the information transferring system. The combined output of linear amplifier 62, of the transmitter encoder of FIG. 1, which includes the selected sideband, the pilot frequencies and the carrier frequency is amplified by automatic gain control (AGC) amplifier 118 of the receiver of FIG. 9. The input of carrier, phase lock loop demodulator 120 is connected to the output of AGC amplifier 118, and the outputs 122 and 124 of phase lock loop 120 are respectively connected to the gain control elements of amplifier 118 and to one of the inputs of balanced demodulator 125. An AGC signal, developed by carrier phase lock loop 120, is applied from output 122 to control the gain of amplifier 118 so that the amplitude of the output signal of amplifier 118 is a known, predetermined value.

Balanced demodulator 125 mixes the carrier frequency of 2,400 Hz with the pilot frequencies and the data frequency band thereby generating sum and difference frequencies. The output of demodulator 125 is connected to the input of low pass filter 126, which selects out the lower sideband of the mixing product of the carrier signal and the data frequency band. This sideband includes frequencies between 0 and 1,440 Hz and includes the $c_n$ signal. The output of demodulator 125 is also connected to the input of timing recovery block 128 which utilizes the sum and difference of the carrier and pilot frequencies to reconstruct frame and bit timing. The $c_n$ signal and the frame and bit timing pulses are applied to decoder 130 which includes a slicer or full wave rectifier for transforming the signal $c_n$ back into the serial data information sequency, $a_n$ and a bit separator that routes or separates the serial bits into parallel paths leading to squelch circuit 132 and through output switching circuit 134 to protective relays 136, 138, 140, 142 and 143. Decoder 130, squelch circuit 132 and output circuit 134 will be described in more detail below.

Figure 10:
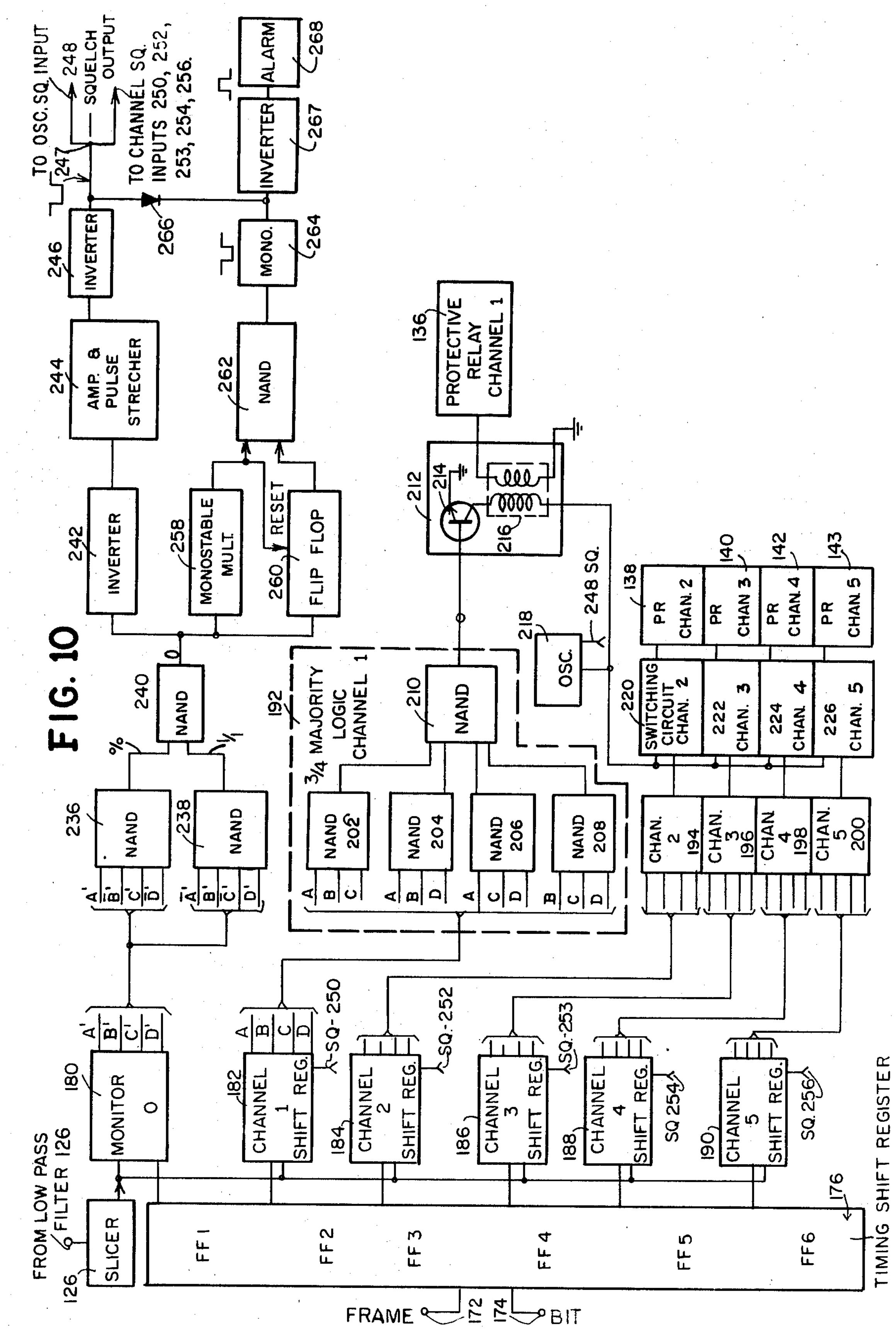
FIG. 10 is a block diagram of the decoder, security and output circuits of the receiver-encoder shown in FIG. 9.

The block diagram of FIG. 10 illustrates the decoding and the squelch or security operations. Shift register 176 may be comprised of a string of six cascaded flip-flops. Input 172 and toggle terminal 174 of shift register or bit separator 176 are respectively connected to receive the frame and bit timing pulses from timing recovery block 128. The bit timing pulses toggle a given frame timing pulse through shift register 176. Slicer 178, the input of which is connected to the output of low pass filter 125, slices or full wave rectifies the $c_n$ signal thereby forming positive polarity or "1" pulses in response to both the −1 and +1 pulses thereof to thereby reconstruct the serial $a_n$ signal from the $c_n$ signal. A first input of monitor channel (channel 0) shift register 180 is connected to the output of slicer 178 and a second input is connected to the output of the first flip-flop ($FF_1$) in shift register 176. Channel 1 shift register 182 likewise has a first input connected to the output of slicer 178 and the second input connected to the second flip-flop ($FF_2$) of shift register 176. Similarly, shift registers 184, 186, 188 and 190 for respective channels 2, 3, 4 and 5 all have one input connected to the output of slicer 178 and another input respectively connected to the outputs of the third ($FF_3$), fourth ($FF_4$), fifth ($FF_5$) and sixth ($FF_6$) flip-flops in shift register 176.

In operation, during a period of time corresponding to the duration between $t_0$ and $t_1$ of FIG. 4, the frame pulse in shift register 176 is applied to monitor shift register 180 thereby allowing the monitor signal state occurring at the output of slicer 178 during that time to be placed therein. At time $t_1$, a bit timing pulse shifts the frame timing pulse in shift register 176 to the toggle input of channel 1 shift register 182, so that the portion of the $a_n$ signal originating from protective relay 1 which occurs during the time bounded by $t_1$ and $t_2$ is entered into shift register 182 from slicer 178. In a similar manner the consecutive portions of $a_n$ signal occurring within the time durations defined by $t_2$ and $t_3$, $t_3$ and $t_4$, $t_4$ and $t_5$, and $t_5$ and $t_0$ are respectively entered in a sequential manner into shift registers 184, 186, 188 and 190. The foregoing cycle continues to repeat as long as frame and bit pulses are applied to timing shift register 176 and $a_n$ signals are being supplied to the monitor and channel shift registers.

It is possible for noise signals or other causes to result in an erroneous or false bits being stored in the channel shift registers. Because of the nature of their sources, such errors tend to occur in sequence in the monitor signal and in the channel signals. To prevent such error bits from causing an undesired triggering of protective relays, the receiver-decoder shown in FIG. 10 contains independent and simultaneously operating security circuits. One security circuit is comprised of a plurality of three-out-of-four majority logic circuits which each monitor the output of one of channel shift registers 182 through 190 to verify that three changes of state initiating signals are received before a change of state is applied to one of the protective relays coupled thereto. Another security circuit is comprised four-out-of-four logic which determines whether the format of the monitor signal code stored in monitor channel shift register 180 conforms to the known, predetermined code therefor developed at monitor signal generator 152. If errors are discovered in the monitor signal code, the channel shift registers are instantaneously reset for selected periods of time depending on the probability of the occurrence of a plurality of error bits.

Block diagram 192, also of FIG. 10, shows the three-out-of-four majority logic for channel 1 shift register 182. The block diagrams for the majority logic in blocks 194 through 200 which respectively monitor the outputs of channel shift registers 184 through 190 are the same as shown for block 192. The three-out-of-four majority logic for channel 1 is comprised of NAND gates 202 through 208. The inputs of these NAND gates are distributively connected to the A, B, C and D outputs of shift register 182. The gates are arranged such that if any of the three out of the four outputs of shift register 182 is in a "1" state, which indicates that a trip initiating or control signal has been developed at channel 1, protective relay 40 of FIG. 2 for at least three successive sampling periods, one of NAND gates 202, 204, 206 or 208 will produce a "1" or change of state output. Thus, if the B, C, and D outputs of channel shift register 182 are all in a "1" state, NAND gate 208 would respond. The outputs of NAND gates 202 through 208 are connected to the input of NAND gate 210. Switching circuit 212 for channel 1 includes transistor 214 whose base is connected to the output of NAND gate 210 and whose collector is coupled through the primary of isolating transformer 216 to the output of normally free-running oscillator 218.

When no change of state initiating signals are being transferred from protective relay 40, provided no error signals are being received, the inputs to NAND gates 202 through 208 will consist of 0's. Therefore, all of corresponding outputs of NAND gates 202 through 208 will be "1's," and the output of NAND gate 210, therefore, will normally be a "0" thereby biasing transistor 214 in the non-conductive or off condition. However, if any three of the four possible A, B, C, or D outputs of shift register 182 are in the "1" state, the output of one of NAND gates 202 through 208 will be a "0" thereby causing a "1" or change of state control signal at the output of NAND gate 210. This change of state or trip signal forward biases transistor 214 thereby placing a ground or reference potential at the end of the primary winding of transformer 216, which enables the coupling of a signal from oscillator 218 through transformer 216 to protective relay 136, thereby initiating its operation in response to the trip condition. Likewise, if any three out of the four possible outputs for any of the other channel shift registers 184 through 190 are in the "1" state, the three-out-of-four majority logic circuitry in blocks 194 through 200 will activate corresponding switching circuits 220 through 226 to enable the output of oscillator 218 to initiate operation of corresponding protective relays 138 through 143.

Squelch circuitry operating on the A′, B′, C′ and D′ outputs of monitor channel shift register 180 provides additional security against error signals. This circuitry includes NAND gates 236 and 238 which are connected to the outputs of monitor channel shift register 180. The inputs of NAND gate 240 are connected to the outputs of NAND gates 236 and 238. The output of NAND gate 240 branches into three parallel paths. The first path is comprised of the series circuit including inverter 242, pulse stretcher 244 and inverter 246 which is connected to squelch output terminal 247. The second and third paths include monostable multivibrator 258 and flip-flop 260 whose outputs are both connected to the input of NAND gate 262. The output of monostable 258 is connected to the reset terminal of flip-flop 260. The input of monostable multivibrator 264 is connected to the output of NAND gate 262; and its output is coupled to squelch output terminal 247 through unidirectional conducting device or diode 266 and to the input of inverter 267. Alarm circuit 268 is connected to the output of inverter 267. Squelch output terminal 247 is connected to the squelch inputs 248 of oscillator 218 and to the respective squelch inputs 250 through 256 of channel shift registers 182 through 190.

As previously pointed out, monitor signal M, having a known pulse code as shown in FIG. 4, is stored in monitor channel shift register 180. The level of monitor signal M alternates between the "1" and "0" states in synchronism with the occurrence of each successive frame. Consequently, if the system is functioning properly the signals at the A′, B′, C′ and D′ outputs of monitor channel shift register 180 will alternate between A, $\overline{B}$, C, $\overline{D}$ and $\overline{A}$, B, $\overline{D}$, C. NAND gates 236 and 238 monitor the output states of shift register 180. NAND gate 236 is arranged to provide a "0" output only when the A′, $\overline{B}$, C′, $\overline{D}$′ code is applied thereto; and NAND gate 238 is arranged to provide a "0" output only when the $\overline{A}$′, B′, $\overline{C}$, D signal is applied thereto. Therefore, if no false error bits are being decoded for the monitor channel, one of either of NAND gates 236 or 238 will always have a "1" output and the other will have a "0" output. If the outputs of NAND gates 236, 238 are both in the "1" state, thereby indicating that an erroneous bit has occurred in the monitor signal and, hence, possibly in the data for the channels, NAND gate 240 provides a "0" at its output.

Considering first the operation of the aforementioned first parallel squelch path, inverter 242 inverts the "0" output of NAND gate 240 to form a "1." Pulse stretcher 244 increases the time duration of the "1" to a first predetermined amount. Inverter 246 produces a first squelch signal of the first predetermined time duration at squelch output terminal 247. This squelch signal renders oscillator 218 inoperative during its duration and resets all outputs of channel shift registers 182 through 190 to "0," thereby preventing a possibly erroneous change of state signal from being applied to any of protective relays 136 through 143.

Now considering the operation of the aforementioned second and third parallel squelch paths, a first "0" output from NAND gate 240 sets the output of monostable multivibrator 258 to a "1" for a second predetermined time to provide a first initiating signal to one input of NAND gate 262. This "1," however, also sets the output of flip-flop 260 to a "0" to provide a non-initiating signal to the other input of NAND gate 262. Under these conditions the output of NAND gate 262 is a "1." But if another "0" is applied from NAND gate 240 to flip-flop 260 while the output of monostable multivibrator remains a "1," flip-flop 260 provides a second "1" or initiating signal at its output. In response to the simultaneous application of "1's" from monostable 258 and flip-flop 260, NAND gate 262 produces a "0" at its output which triggers monostable multivibrator 264 to produce a second negative-going squelch pulse of a third predetermined time duration on the order of several frames which has a relatively long duration as compared to the duration of the first squelch pulse produced at the output of inverter 246, which is on the order of two frames.

This second squelch pulse, therefore, is generated in response to the occurrences of two squelch signals at the output of NAND gate 240 within a predetermined time period, which indicates that there is probably a group of error signals being caused by noise, system malfunction or perhaps both. The long duration, negative squelch pulse is conducted through diode 266 to squelch the oscillator and channel shift registers, thereby providing additional security or discrimination against error signals, and through inverter 267 to activate system alarm device 268. Diode 266 prevents the squelch signals occurring at the output of inverter 246 from being applied to inverter 267 and activating alarm 268.

Although the data transferring system has been described as transmitting trip or control signals between protective relays operating in a direct transfer trip (DDT) power transmission line protective scheme, it can also transfer the phase of continuous 60 cycle signals between protective relays operating in a phase comparison (PC) power transmission line protective scheme. As previously pointed out, in a phase comparison protective scheme, the respective outputs of protective relays 40 through 48 are 60 cycle square waves representing the phase of the signals at selected points on power transmission lines. Each of these square waves is sampled by combiner 50 during each frame thereby providing phase information which is transferred in the aforementioned manner to shift register 176. In the PC system, the outputs of shift register 176, however, would not pass through the channel logic but could be paralleled directly to protective relays 136 through 143 wherein the transmitted phases would be compared with the phases of local signals at selected points on corresponding power transmission lines to determine whether the power transmission lines are conducting properly. In addition, it is believed to be apparent to one skilled in the art that the data transferring system could be utilized to transfer digital information from a plurality of sources providing digital information of any kind so long as the information rates thereof are compatible with the monitor signal rate and sampling rate, i.e., so long as the digital information rate from each of the data sources is no greater than the repetition rate of the monitor signal multiplied by the number of data sources plus one.

What has been described, therefore, is a binary data transmission system which facilitates secure information transfer at relatively high speeds, as compared to prior art FSK/FDM systems. Moreover, the transfer may be effectuated in a constrained bandwidth such as that imposed by a voice band transmission line. The system, while being particularly adapted to providing communication between protective relays, could be advantageously employed in many applications where secure high speed data transfer in a relatively constrained bandwidth is desirable.

We claim:

1. A data security system for discriminating against errors in data occurring in a data transfer system which transfers data originating at an output terminal of a data source to an output terminal of the data transfer system, the data security system including in combination:

monitor signal generator means adapted to provide a monitor signal of a known data code at its output terminal;

combiner means having a first input terminal connected to said output terminal of said monitor signal generator means and a second input terminal connected to the output terminal of the data source, said combiner means sequentially sampling the output signals of said monitor signal generator means and the data source to form a serial bit stream which is transferred by the data transfer system to the output terminal thereof;

bit stream separator means having an input terminal connected to the output terminal of the data transfer system and first and second output terminals, said bit stream separator means selectively providing signals originating at the data source to said first output terminal thereof and signals originating at said monitor signal generator means to said second output terminal thereof;

a data utilization device having an input terminal connected to said first output terminal of said bit stream separator means and a squelch input terminal, said data utilization device being rendered inoperative in response to a squelch signal applied to said squelch input terminal thereof;

logic means having an input terminal and a squelch output terminal, said input terminal of said logic means being connected to said second output terminal of said bit stream separator means, said logic means being responsive to any data code other than said known data code to produce a squelch signal at said squelch output terminal thereof; and first circuit means connecting said squelch output terminal of said logic means to said squelch input terminal of said data utilization device so that said squelch signals provided by said logic means render said data utilization device inoperative.

2. The data security system of claim 1 further including:

majority logic means having an input terminal connected to said first output terminal of said bit separator means and an output terminal connected to said squelch input terminal of said data utilization device; and said majority logic means being responsive to a particular information signal being applied thereto from said bit separator means a predetermined number of times within a predetermined time duration to provide a third control signal at its output terminal which renders said data utilization device inoperative.

3. The data security system of claim 1 wherein said logic means includes:

a monitor code logic circuit having an input terminal connected to said input terminal of said logic means and an output terminal, said monitor code logic circuit providing a first control signal at said output terminal thereof in response to each application thereto of any data bit which is inconsistent with said known data code; and control signal processing means connected from said output terminal of said monitor code logic means to said squelch output terminal of said logic means, said control signal processing means converting each of said first control signals into one of said squelch signals.

4. The data security system of claim 3 wherein said control signal processing means includes pulse shaping means connected between said output terminal of said monitor code logic circuit and said squelch output terminal of said logic means, said pulse shaping means providing a squelch signal at said squelch output terminal of said logic means of a first predetermined time duration in response to each of said first control signals.

5. The data security system of claim 3 wherein said control signal processing means further includes:

first timing means having an output terminal and an input terminal connected to said output terminal of said monitor code logic circuit and being responsive to a first one of said first control signals to provide a first initiating signal at its output terminal which has a second predetermined time duration;

second circuit means having an output terminal and a first input terminal connected to said output terminal of said monitor code logic circuit and a second input terminal connected to said output terminal of said first timing means, said second circuit means being responsive to said first initiating signal to provide a non-initiating signal at its output terminal; said second circuit means being responsive to at least a second one of said first control signals occurring during said second predetermined time duration to provide a second initiating signal at its output terminal;

gate means having an output terminal, a first input terminal connected to said output terminal of said first timing means and a second input terminal connected to said output terminal of said second circuit means, said gate means producing a second control signal at its output terminal in response to the application thereto of said first and second initiating signals;

second timing means having an output terminal and an input terminal connected to said output terminal of said gate means and responding to said second control signal to provide a squelch signal at its output terminal having a third predetermined time duration; and third circuit means coupling said output terminal of said second timing means to said squelch output terminal of said logic means.

6. The data security system of claim 4 further including:

alarm means connected to said output of said second timing circuit means.

7. A data transferring system, including in combination:

monitor signal source providing at its output a digital monitor signal having a known code;

a plurality of data sources each providing at its output a digital information signal to be transferred;

combiner means connected to said output of said monitor signal source and to the outputs of each of said plurality of data sources, said combiner means sequentially sampling said digital monitor signal and said digital information signals to form a serial, binary bit stream therefrom at its output;

encoding means connected to said output of said combiner means and transforming said serial, binary bit stream into a ternary waveform at its output;

decoding means coupled to the output of said encoding means and converting said ternary waveform back into said serial, binary bit stream at its output;

bit separator means connected to the output of said decoding means and applying said digital monitor signal to a monitor signal output thereof and each of said plurality of digital information signals to each of a plurality of corresponding information output terminals;

said digital monitor signal tending to have error bits occurring therein in sequence with error bits occurring in said digital information signals;

each of a plurality of data utilization devices connected to each of said plurality of information output terminals of said bit separator means;

monitor signal processing means coupled to said monitor signal output of said bit separator means, said monitor signal processing means being responsive to each of said error bits in said digital monitor signal to provide a squelch signal at a squelch output terminal thereof; and said squelch output terminal being connected to each of said plurality of data utilization devices so that said squelch signal renders the same inoperative during the duration thereof.

8. The data transferring system of claim 7 wherein said monitor signal processing means includes:

monitor code logic means providing a first control signal at an output terminal thereof in response to each application thereto of one of said error bits; and control signal processing means connected from said output terminal of said monitor code logic means to said squelch output terminal and converting each of said first control signals into one of said squelch signals.

9. The data transferring system of claim 8 wherein said control signal processing means includes pulse shaping means connected between said output terminal of said monitor code logic means and said squelch output terminal, said pulse shaping means providing a squelch signal at said squelch output terminal having a first predetermined time duration in response to each of said first control signals.

10. The data transferring system of claim 9 wherein said control signal processing means further includes:

first timing means connected to said output terminal of said monitor code logic means and being responsive to a first one of said first control signals to provide a first initiating signal at its output terminal having a second predetermined time duration;

second circuit means also connected to said output terminal of said monitor code logic means, said second circuit means being responsive to said first one of said first control signals to provide a non-initiating signal at its output terminal, said second circuit means being responsive to a second one of said first control signals occurring during said second predetermined time duration to provide a second initiating signal at its output terminal;

gate means having a first input terminal connected to the output terminal of said first timing means and a second input terminal connected to the output terminal of said second circuit means, said gate means producing a second control signal at its output terminal in response to the simultaneous application of said first and second initiating signals to its first and second input terminals;

second timing circuit means having an input terminal connected to said output terminal of said gate means and responding to said second control signal to provide a squelch signal having a third predetermined time duration at its output terminal; and, third circuit means coupling the squelch signal having a third predetermined time duration to said squelch output terminal.

11. The data security system of claim 10 further including:

alarm means connected to said output terminal of said second timing circuit means and being activated by said squelch signals applied thereto, said third circuit means having a unidirectional coupling means which conducts said squelch signals having a third predetermined time duration to said squelch output terminal, said unidirectional coupling means preventing said squelch signals of a first predetermined time duration from being applied to said alarm means.

12. The data transferring system of claim 7 wherein each of said plurality of data sources includes measuring means for monitoring electrical quantities on a power line and developing said digital information signal in response thereto, and each of said data utilization devices includes protective means for selectively removing electrical power from said power line in response to a third control signal.

13. The data transferring system of claim 12 wherein each of said plurality of data utilization devices further includes:

majority logic means which is responsive to a particular information signal having been applied thereto a predetermined number of times within a fourth predetermined time duration to provide said third control signal at its output.

14. The data transferring system of claim 7 further including transmission means connecting said encoding means to said decoding means, said transmission means having a selected band pass characteristic.

15. The data transferring system of claim 14 wherein said transmission means is a transmission line.

16. The data transferring system of claim 12 wherein said encoding means has polybinary correlative encoding means including:

first signal means forming a first encoded signal comprised of a modulo-two addition of said serial binary bit stream and said first encoded signal which is delayed by two bits;

second signal means forming said ternary signal at its output terminal by adding the inverse of said first encoded signal delayed by two bits to said first encoded signal, said ternary signal thereby having a sine function frequency spectrum; and, low pass filter means connected to said output terminal of said second signal means and selecting said frequency components of said ternary waveform within a first recurring portion of said sine function frequency spectrum to provide a filtered ternary waveform at its output terminal.

17. The data transferring system of claim 14 wherein said encoding means includes:

generator means providing a constant frequency sinusoidal signal at its output terminal, modulator means connected to said output terminal of said frequency generator means and said output terminal of said low pass filter, said modulator means amplitude modulating said constant frequency sinusoidal signal with said filtered ternary signal to produce a sideband at its output terminal having a frequency spectrum included in said selected bandpass characteristic of said transmission means;

band pass filter means being connected to said output terminal of said modulator means and providing said sideband at its output terminal; and said transmission means coupling said sideband to said decoding means.

18. The data transferring system of claim 17 wherein said decoding means includes:

mixing means deriving said filtered ternary signal from said sideband and providing the filtered ternary signal at its output; and slicing means converting said filtered ternary signal back into said serial binary bit stream.

19. The data transferring system of claim 7 wherein:

said monitor signal is comprised of a square wave having a first repetition rate;

said combiner means sequentially samples said monitor signal source and each of said plurality of data sources during every half cycle of said monitor signal to form said binary bit stream; and, said digital information signal has a second repetition rate no greater than said first repetition rate multiplied by the number of said plurality of said data sources plus one.

20. A data transferring system for communicating a digital information signal occurring at the output terminal of at least one data source to a data utilization device at a desired location, the system including in combination:

monitor signal source having an output terminal and providing a digital monitor signal having a known code at such output terminal;

combiner means having an output terminal, a first input terminal connected to said output terminal of said monitor signal source and a second input terminal connected to the output terminal of the data source, said combiner means sampling said digital monitor signal during a predetermined time period and said digital information signal to form a binary bit stream therefrom at its output terminal;

encoding means having an output terminal and an input terminal connected to said output terminal of said combiner means for transforming said binary bit stream into a second bit stream at its output terminal;

communication link means for connecting said encoding means to decoding means;

decoding means having an output terminal, a squelch input terminal and a data input terminal, said data input terminal being coupled to said communication link means, said decoding means converting said information signal back into said binary bit stream at its output terminal;

a data utilization device having an input terminal connected to said output terminal of said decoding means, said data utilization device being responsive to the digital information signal originating at the data source;

logic means having an input terminal connected to said output terminal of said decoding means, said logic means being responsive during a time period corresponding to said predetermined time period to data codes other than said known data code to provide a squelch signal at a squelch output terminal thereof; and first circuit means connecting said squelch output terminal of said logic means to said squelch input terminal of said decoding means, said squelch signals rendering said decoding means inoperative for predetermined time durations so that error signals occurring in said binary bit stream at said output terminal of said decoding means are not applied to said data utilization device.

21. The data transferring system of claim 20 wherein said communication link means includes a sine function filter.

22. The data transferring system of claim 20 further including in combination:

timing generator means for developing a plurality of timing signals all of which are synchronized with each other and for applying such timing signals to a corresponding plurality of output terminals;

second circuit means connecting one of said plurality of output terminals of said timing generator means to said monitor signal generator so that one of said timing signals is applied thereto;

third circuit means connecting one of said plurality of output terminals of said timing generator means to said combiner means so that one of said timing signals is applied thereto;

fourth circuit means connecting one of said plurality of output terminals of said timing generator means to said encoding means so that one of said timing signals is applied thereto;

fifth circuit means connecting one of said plurality of output terminals of said timing generator means to said communication link means so that one of said timing signals is applied thereto, said communication link means transferring said timing signal applied thereto to said decoding means; and said timing signals synchronizing the operation of said monitor signal generator, combiner means, encoding means and said decoding means.

* * * * *